United States Patent
Creamer et al.

(10) Patent No.: US 7,216,143 B2
(45) Date of Patent: *May 8, 2007

(54) INSTANT MESSAGING WITH VOICE CONFERENCE FEATURE

(75) Inventors: Thomas E. Creamer, Boca Raton, FL (US); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 636 days.

This patent is subject to a terminal disclaimer.

(21) Appl. No.: 10/038,719

(22) Filed: Jan. 3, 2002

(65) Prior Publication Data

US 2003/0126207 A1     Jul. 3, 2003

(51) Int. Cl.
*G06F 15/16*     (2006.01)
(52) U.S. Cl. .................. 709/204; 709/205; 709/207
(58) Field of Classification Search ......... 709/204–207
See application file for complete search history.

(56) References Cited

U.S. PATENT DOCUMENTS

| | | | | |
|---|---|---|---|---|
| 6,175,619 B1* | 1/2001 | DeSimone | ............ | 379/202.01 |
| 6,212,548 B1* | 4/2001 | DeSimone et al. | ......... | 709/204 |
| 6,301,609 B1* | 10/2001 | Aravamudan et al. | ...... | 709/207 |
| 6,360,252 B1* | 3/2002 | Rudy et al. | .................. | 709/206 |
| 6,377,944 B1* | 4/2002 | Busey et al. | ................... | 707/3 |
| 6,484,196 B1* | 11/2002 | Maurille | ..................... | 709/206 |
| 6,501,834 B1* | 12/2002 | Milewski et al. | ......... | 379/93.24 |
| 6,628,767 B1* | 9/2003 | Wellner et al. | ......... | 379/202.01 |
| 6,650,747 B1* | 11/2003 | Bala et al. | ............. | 379/265.06 |
| 6,671,262 B1* | 12/2003 | Kung et al. | .................. | 370/260 |
| 6,677,976 B2* | 1/2004 | Parker et al. | ................ | 709/204 |
| 6,678,719 B1* | 1/2004 | Stimmel | ...................... | 709/204 |
| 6,694,351 B1* | 2/2004 | Shaffer et al. | .............. | 709/204 |
| 6,697,474 B1* | 2/2004 | Hanson et al. | ......... | 379/201.01 |
| 6,699,125 B2* | 3/2004 | Kirmse et al. | ................ | 463/42 |
| 6,701,347 B1* | 3/2004 | Ogilvie | ....................... | 709/206 |
| 6,757,365 B1* | 6/2004 | Bogard | ..................... | 379/88.17 |
| 6,757,732 B1* | 6/2004 | Sollee et al. | ................ | 709/227 |
| 6,760,754 B1* | 7/2004 | Isaacs et al. | ................ | 709/206 |
| 6,772,188 B1* | 8/2004 | Cloutier | ..................... | 709/224 |
| 6,807,562 B1* | 10/2004 | Pennock et al. | ............ | 709/204 |
| 6,938,069 B1* | 8/2005 | Narayanaswamy | .......... | 709/204 |

(Continued)

OTHER PUBLICATIONS

Rodenstein, Roy et al. "Talking in Circles: Designing a Spatially-Grounded Audioconferencing Environment." Proceedings of the SIGCHI Conference on Human Factors in Computing Systems. The Hague, the Netherlands, 2000. ACM Press. pp. 81-88.*

(Continued)

*Primary Examiner*—Jason Cardone
*Assistant Examiner*—Jeffrey R. Swearingen
(74) *Attorney, Agent, or Firm*—Akerman Senterfitt

(57) ABSTRACT

An instant messaging or chat (IM/chat) communication method can include a series of steps. The steps can include inserting in an instant message (IM) a voice conference identifier comprising a voice conference call list identifying conference call nodes. The IM can be transmitted to a recipient at a recipient node. Responsive to the recipient selecting the voice conference identifier, a voice conference call between selected ones of the identified conference call nodes can be established.

32 Claims, 3 Drawing Sheets

U.S. PATENT DOCUMENTS

| | | | | |
|---|---|---|---|---|
| 7,107,312 | B2* | 9/2006 | Hackbarth et al. | 709/204 |
| 2002/0023131 | A1* | 2/2002 | Wu et al. | 709/205 |
| 2002/0023134 | A1* | 2/2002 | Roskowski et al. | 709/206 |
| 2002/0059073 | A1* | 5/2002 | Zondervan et al. | 704/270.1 |
| 2002/0071539 | A1* | 6/2002 | Diament et al. | 379/202.01 |
| 2002/0071540 | A1* | 6/2002 | Dworkin | 379/202.01 |
| 2002/0143876 | A1* | 10/2002 | Boyer et al. | 709/205 |
| 2003/0018725 | A1* | 1/2003 | Turner et al. | 709/206 |
| 2003/0208543 | A1* | 11/2003 | Enete et al. | 709/206 |

OTHER PUBLICATIONS

Nardi, Bonnie et al. "Interaction and Outeraction : Instant Messaging in Action." Proceedings of the 2000 ACM Conference on Computer Supported Cooperative Work. Philadelphia, PA, 2000. ACM Press. pp. 79-88.*

Milewski, Allen et al. "Providing Presence Cues to Telephone Users". Proceedings of the 2000 ACM Conference on Computer Supported Cooperative Work. Philadelphia, PA, 2000. ACM Press. pp. 89-96.*

Jiang, Wenyu et al. "Towards Junking the PBX : Deploying IP Telephony". Proceedings of the 11th International Workshop on Network and Operating Systems Support for Digital Audio and Video. Port Jefferson, NY, 2001. pp. 177-185.*

Nardi, Bonnie et al. "Interaction and Outeraction: Instant Messaging in Action." Proceedings of the 2000 ACM Conference on Computer Supported Cooperative Work. Dec. 2000. Philadelphia, PA. ACM Press, pp. 79-88.*

U.S. Appl. No. 09/910,187, filed Jul. 19, 2001, Creamer et al.
U.S. Appl. No. 09/910,270, filed Jul. 19, 2001, Creamer et al.
U.S. Appl. No. 09/910,271, filed Jan. 19, 2001, Creamer et al.

* cited by examiner

INSTANT MESSAGING WITH VOICE CONFERENCE FEATURE

BACKGROUND OF THE INVENTION

1. Technical Field

This invention relates generally to Internet-based communication systems, and more particularly to text-based Internet communications system such as instant messaging and on-line chat.

2. Description of the Related Art

Text-based Internet communication systems such as instant messaging and chat over a data communications link have become increasingly popular due to the substantially real time nature of the communication, low cost, and simplicity of use. The instant messaging or chat (IM/chat) client typically has a message text window in which an incoming text-based instant message (IM) can be presented to an end user. IMs that are sent by the end user through the IM/chat client also can appear in the message text window.

IM/chat systems work well for many communications, but there are times when clients would prefer voice communications. For example, on occasion the contents or subject matter of an IM/chat session can give rise to a desire for voice communications. In such instances, it is usually necessary to terminate the IM/chat session, drop the data communications link, and establish a voice communications link through known methods such as conventional telephony over the publically switched telephone network (PSTN). In such instances, the spontaneity of the conversation is lost, and details of the conversation can be forgotten. The voice communications link sometimes cannot be established, in which case all communications, both data and voice, are terminated. In other instances, the extra steps necessary to establish a voice communications link impedes some from establishing such a link even when a voice link can be necessary or desirable.

Conventional IM/chat systems also can support the exchange of attachments. Attachments are electronic files such as images, documents, or binary objects which can be attached to an IM and transmitted therewith from a sender to a recipient. Attachments can be embedded in a labeled section of an IM such that an IM/chat client processing the IM can identify the presence of an attachment and can decode the contents of the attachment so that the attachment can be further processed by the recipient. Hence, attachments can enhance the utility of exchanging IMs and can provide a supplemental medium for communicating ideas between participants in an IM/chat session.

Still, IM and IM attachments are not always an adequate replacement for live voice conversations between IM/chat session participants, particularly where extensive interaction between the participants is necessary or desirable. In some instances, live voice conversations are necessary to explain or discuss the message text included in the IM, attached documents, or audio/visual files. Moreover, a telephone sometimes is not available to the participants, or the use of a telephone requires lengthy dialing procedures which interrupt the spontaneity of the communication. Sometimes telephone access by the participants requires that at least one of the participants terminate an on-line connection to the Internet, which further can disrupt the process of discussing the contents of an IM.

The aforementioned difficulties further can be exacerbated when more than two parties need to be involved within a given IM communication chain. Moreover, inclusion of more than two parties within an IM/chat session assumes that each party's IM/chat client has the capability of handling IM/chat sessions with more than two other IM/chat clients simultaneously and within a single text window. If so, though the sending party can be identified easily, it can be difficult to determine the party to which a particular IM is directed. If an IM client only supports two-way IM communications, the parties must initiate multiple two-way IM sessions. In that case, IMs can be sent in a serial fashion from one party to the next, resulting in duplicate information being transmitted to each party within the IM chain. This redundant transmission of data can result in unnecessary communication delays between the parties. For example, the content of an IM can be retyped and re-sent to several different parties before ultimately reaching the proper party.

SUMMARY OF THE INVENTION

The present invention provides an instant messaging or chat (IM/chat) communications method and system for processing an instant message (IM) which has been configured in accordance with the inventive arrangements. A voice conference identifier can be included within the IM. The voice conference identifier can include a voice conference call list specifying conference call nodes. A recipient node of the IM can detect the voice conference identifier in the IM, and in addition to displaying message text contained in the message, can display one or more selectable icons. Responsive to the selection of one or more of the icons, a voice communications link can be established between selected conference call nodes. The voice communications link can be a Voice over IP (VoIP) based voice communications link over the computer communications network or a telephony-based voice communications link over a public switched telephone network (PSTN).

One aspect of the present invention can include an IM/chat communication method including inserting in an IM a voice conference identifier comprising a voice conference call list identifying conference call nodes. The voice conference call list can specify telephone numbers or IP addresses for the identified conference call nodes. The IM can be transmitted to a recipient at a recipient node, wherein responsive to the recipient selecting the voice conference identifier, a voice conference call between selected ones of the identified conference call nodes can be established. Notably, the conference call can be established using VoIP based voice communications links or telephony-based voice communications links over the PSTN.

A selectable symbol for initiating the voice conference call with selected ones of the identified conference call nodes also can be inserted in the IM. Alternatively, a plurality of selectable symbols can be inserted in the IM. In that case, each symbol can initiate a voice communications link with a selected one of the identified conference call nodes. Additionally, computer program code can be embedded in the IM. The computer program code can be configured to establish a plurality of voice communications links between the selected ones of the identified conference call nodes thereby establishing the conference call.

Another aspect of the invention can include an IM/chat communication method including detecting a voice conference identifier having a voice conference call list identifying conference call nodes in an IM received by a recipient at a recipient node. The voice conference call list can specify telephone numbers or IP addresses for the identified conference call nodes. Responsive to detecting the voice conference identifier, at least one selectable icon can be displayed. Additionally, responsive to a selection of the at least one selectable icon, a voice conference call between selected ones of the identified conference call nodes can be established.

For example, a single icon can be displayed wherein the voice conference call between the selected ones of the identified conference call nodes can be established responsive to the selection of the single icon. Alternatively, a plurality of icons can be displayed. In that case, each icon can correspond to one of the voice conference call nodes. A voice communications link with the selected ones of the conference call nodes can be established responsive to selection of corresponding ones of the plurality of icons.

The establishing step can include extracting from the IM embedded computer program code configured to establish the voice conference call between the selected ones of the identified conference call nodes. Responsive to the selection of the at least one icon, the embedded computer program code can be executed in order to establish the voice conference call. In addition, responsive to the selection of the at least one icon, a telephone number or an IP address for the selected ones of the identified conference call nodes can be determined based on the voice conference call list. Regardless, the voice conference call can be established using VoIP based voice communications links or telephony-based voice communications links over the PSTN.

Another aspect of the invention can include an IM comprising header information identifying a sending node and a recipient node, a message portion displaying content from the sending node to the recipient node, and a voice conference identifier. The voice conference identifier can include a voice conference call list specifying conference call nodes to be connected via a voice conference call, wherein the recipient node is a conference call node. The IM further can include embedded computer program code. The computer program code can be configured to establish a plurality of voice communications links between selected ones of the specified conference call nodes thereby establishing the conference call.

Yet another aspect of the invention can include an IM/chat session client comprising a conventional IM processor. The conventional IM processor can extract and display message text encapsulated in a received IM. A voice conference processor also can be included. The voice conference processor can identify a voice conference identifier encapsulated in the received IM, display at least one selectable icon in response to detecting the voice conference identifier, and responsive to a selection of the at least one selectable icon, establish a voice conference call between selected conference call nodes specified by the voice conference identifier.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The present invention provides an instant messaging or chat (IM/chat) communications method and system for processing an instant message (IM) which has been configured in accordance with the inventive arrangements. A voice conference identifier can be included in an IM sent by a sending node. The voice conference identifier can include a voice conference call list specifying voice conference call nodes. When a voice conference identifier has been included within an IM, a recipient node of the IM can detect the voice conference identifier. In addition to displaying message text contained in the IM, an IM/chat client at the recipient node can display one or more selectable icons. Responsive to the selection of one or more of the icons, a voice communications link can be established between the recipient node and selected specified conference call nodes. Notably, the sender of the IM can be included within the identified conference call nodes. The voice communications link can be a Voice over IP (VoIP) based voice communications link over the computer communications network, or a telephony-based voice communications link over a public switched telephone network (PSTN).

Figure 1:
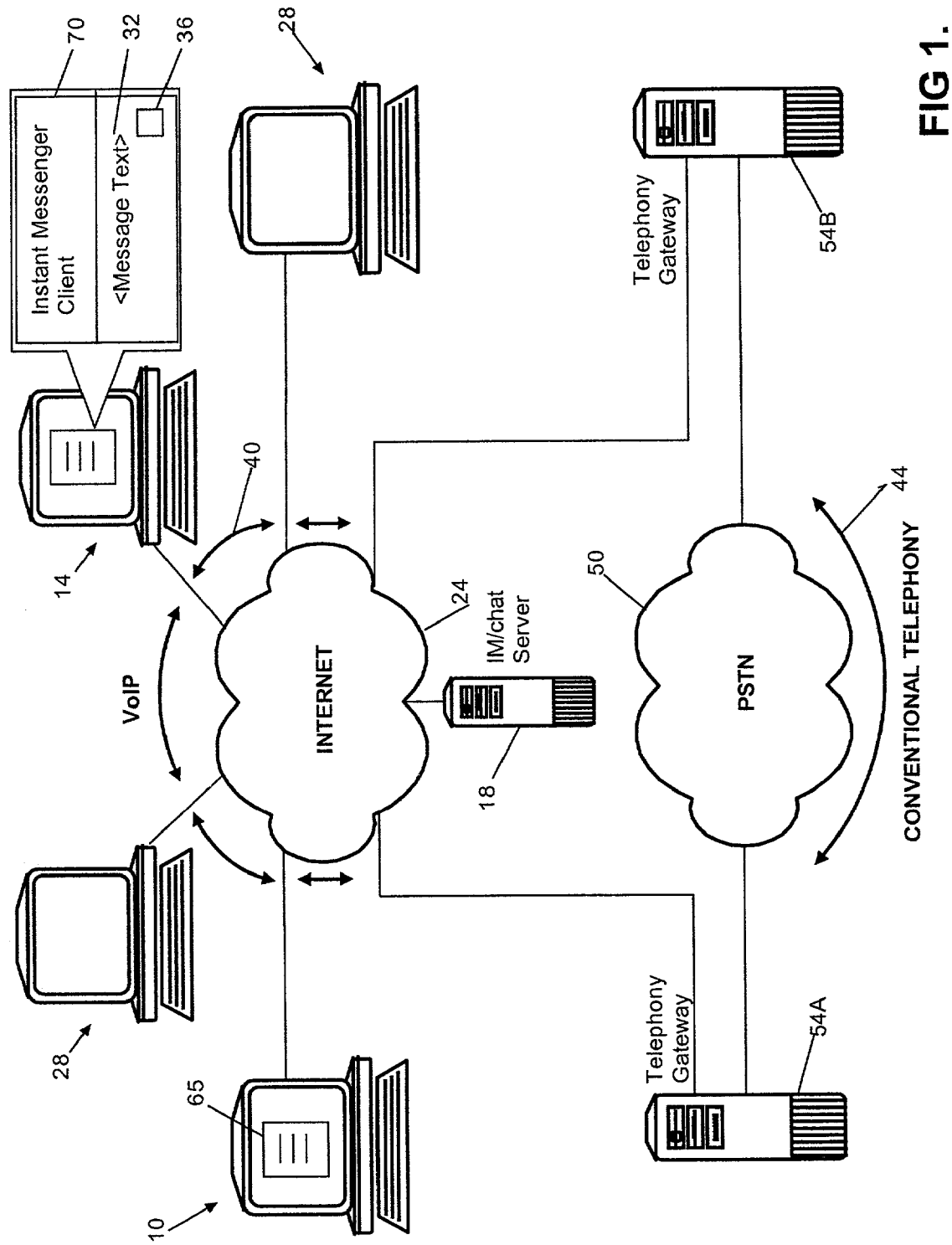
FIG. 1 is a schematic diagram of a network based instant messaging or chat (IM/chat) system for use in the present invention.

An exemplary network based IM/chat system according to the invention is shown in FIG. 1. A first IM/chat client 65 in a sending node 10 and a second IM/chat client 70 in a recipient node 14 are shown although the invention can be utilized with any number and configuration of IM/chat clients acting as both sending and recipient nodes. In one exemplary case illustrated in FIG. 1, IMs can be transmitted and received by the first IM/chat client 65 over a computer communications network such as the Internet 24 through an IM/chat server 18. Similarly, IMs can be transmitted and received by the second IM/chat client 70 over a computer communications network such as the Internet 24 through the IM/chat server 18. The invention, however, is not limited to a particular IM/chat server configuration and one or more IM/chat servers can be used by both the first and second IM/chat clients 65 and 70 to send and receive IMs.

Once received, an IM can be parsed and the contents 32 can be displayed in the IM/chat client 70 as is well-known in the art. Information pertaining to the identity of the sending, recipient, and conference call participants, as well as the sending, recipient, and conference call nodes can be extracted from the IM and optionally displayed in the IM/chat client 70. Other pertinent data also can be extracted from the IM and optionally displayed in the IM/chat client 70. Examples of pertinent data can include references to the sending node and one or more recipient nodes such as network IP addresses. Pertinent data also can include a message subject and transmission date and time information.

Importantly, a voice conference identifier can be included in the IM to indicate that a voice communications link can be established between a plurality of conference call nodes. For example, the voice conference identifier can include a voice conference call list specifying the conference call nodes as a separate data source. Alternatively, the voice conference call list can include references to one or more conventional IM fields such as "To" or "From". Also, if the IM provides other fields such as "CC" (carbon copy), and "BC" (blind copy), those fields, as well as any other fields provided within the IM header can be referenced. Regardless, the voice conference identifier can specify a plurality of conference call nodes 28 such that voice communications links can be established between the conference call nodes. It should be appreciated by those skilled in the art that the recipient node 14 and the sending node 10 can be included within the conference call. Accordingly, conference call nodes 28, as used herein can include the recipient node 14 and the sending node 10 if so specified within the voice conference call list. Further conference call nodes 28 can include other nodes in the computer communications network to be included in the conference call.

Upon receipt of an IM, the IM/chat client 70 can detect the voice conference identifier when parsing the IM. Responsive to detecting a voice conference identifier in the IM, the IM/chat client can display a selectable voice communications icon 36 which can indicate to an IM recipient that voice communications links can be established between the conference call nodes specified within the voice conference identifier. The icon 36 can be displayed within the present message text 32, although alternative placement of the icon 36 is possible. The icon 36 can be any suitable text or graphic symbol, but preferably represents voice communications to a typical viewer.

Selection of the icon 36 by a viewer or receiving party can cause the establishment of multiple voice communications links between the specified conference call nodes 28 thereby resulting in a conference call. In particular, though the voice communications links can be provided through any suitable voice communications technology, in one aspect of the present invention, a voice communications link 40 can be provided over the Internet 24 based upon the VoIP protocol. In another aspect of the invention, a voice communications link 44 can be provided using a conventional telephony link 44 provided by conventional telephony gateways 54A and 54B over a PSTN 50.

In another embodiment of the invention, the IM/chat client 70 can display a plurality of selectable icons 36 wherein each selectable icon can correspond to a particular conference call node. Accordingly, responsive to the selection of each icon 36, a voice communications link can be established between the recipient node and the conference call node corresponding to the selected icon as well as with other conference call nodes having an established voice communications link with the recipient node. Alternatively, responsive to selection of two or more icons, voice communications links can be established between the conference call nodes corresponding to the selected icons.

Figure 2:
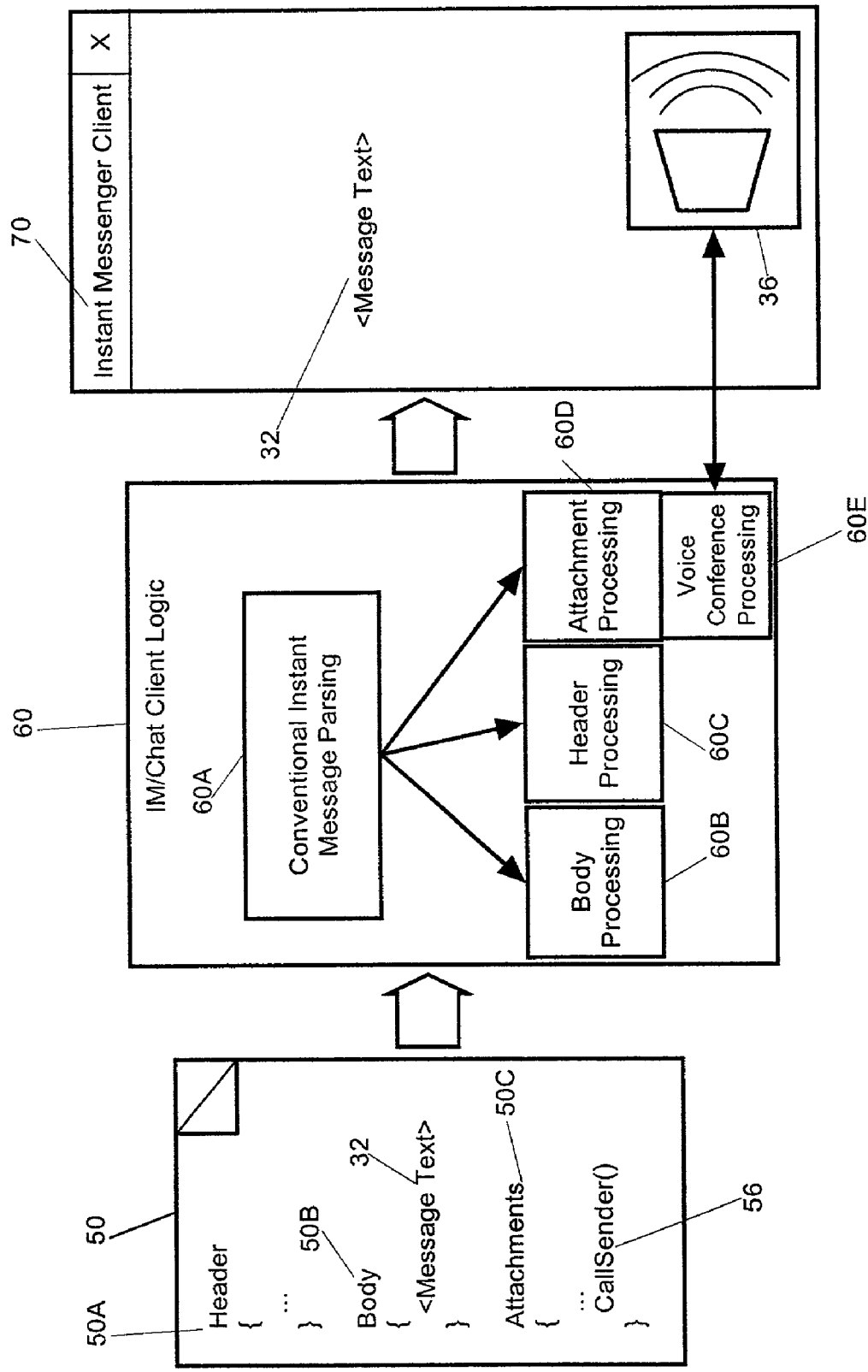
FIG. 2 is a block diagram of an IM/chat client processing an IM configured with a voice conference feature in accordance with the inventive arrangements.

FIG. 2 is a block diagram which illustrates an exemplary process sequence in an IM/chat client configured in accordance with the present invention. In particular, as shown in FIG. 2, an IM 50 can be configured with a voice conference identifier 56. IM/chat client logic 60 can process the IM 50 so that the message text 32 can be displayed in the IM/chat client 70. IM/chat client logic 60 also can process the IM 50 so as to detect the voice conference identifier 56 and to responsively provide a selectable icon 36 in the IM/chat client 70.

More particularly, in accordance with the inventive arrangements an IM 50 can be configured to include a message header component 50A which can encapsulate a reference to at least one of a sending node in the network and a recipient node in the network. The IM 50 also can be configured to include a text message component 50B which can encapsulate message text 32. The message text 32 can be extracted from the IM 50 and displayed in a message client 70. Finally, the IM 50 can be configured to include an attachments component 50C which can encapsulate message attachments in addition to the voice conference identifier 56.

Notably, the voice conference identifier 56 can include basic information denoting the ability to establish voice communications links with specified conference call nodes. Notwithstanding, the invention is not limited in this regard and in an alternative aspect of the invention, the voice conference identifier 56 can include an executable voice communications link program component. When executed, the voice communications link program can establish a voice communications link between the specified conference call nodes.

As will be apparent to one skilled in the art, the voice communications link program component can be implemented using not only a scripting language such as Javascript or VBScript, but also the voice communications link program component can be a compiled object whose binary representation is included in the IM 50. In that case, when extracted from the IM 50, the compiled object can be independently executed without requiring intermediate script interpretation. Finally, it will be apparent to one skilled in the art that the voice communications link program can be a reference to a program residing elsewhere in a computer communications network. Selection of the reference can cause the program to be downloaded and executed in the recipient node.

Returning now to FIG. 2, IM/chat client logic 60 associated with the IM/chat client 70 can process the IM 50, first by parsing the contents of the IM 50 in an IM parsing component 60A. In particular, the message text 32 in the IM 50 can be extracted from the IM 50 using body processing component 60B. Likewise, header information such as the address of the sender and recipients, can be extracted from the IM using header processing component 60C. Finally, attachments included in the IM 50 can be processed in the attachment processing component 60D.

As shown in FIG. 2, a voice conference processor 60E can be provided for use in the IM/chat client logic 60. The voice conference processor 60E can detect the presence of the voice conference identifier 56 encapsulated in the IM 50. Responsive to detecting the voice conference identifier 56, the voice conference processing component 60E can cause the placement of a selectable icon 36 in the IM/chat client 70. Subsequently, the selection of the selectable icon 36 can cause the establishment of voice communications links between the specified conference call nodes. Notably, the establishment of the voice communications links can be achieved through program code provided by the IM/chat client 70, by a plug-in to the IM/chat client, by the IM 50 itself, or by remote code referenced by either the IM/chat client 70 or the voice conference identifier 56.

The identity information required to establish the voice communications links can be provided in the message header component 50A. Still, the invention is not limited in this regard and the message header component 50A can merely contain a reference to the sending node, recipient nodes, or even other conference call nodes, which, in of itself, can be inadequate to establish voice communications links. In that case, the reference can be used to retrieve the required information. For example, the reference can act as a key to a directory lookup service such as an LDAP database. Using the key, suitable identity information can be retrieved, such as IP addresses and telephone numbers, with which voice communications links can be established.

Figure 3:
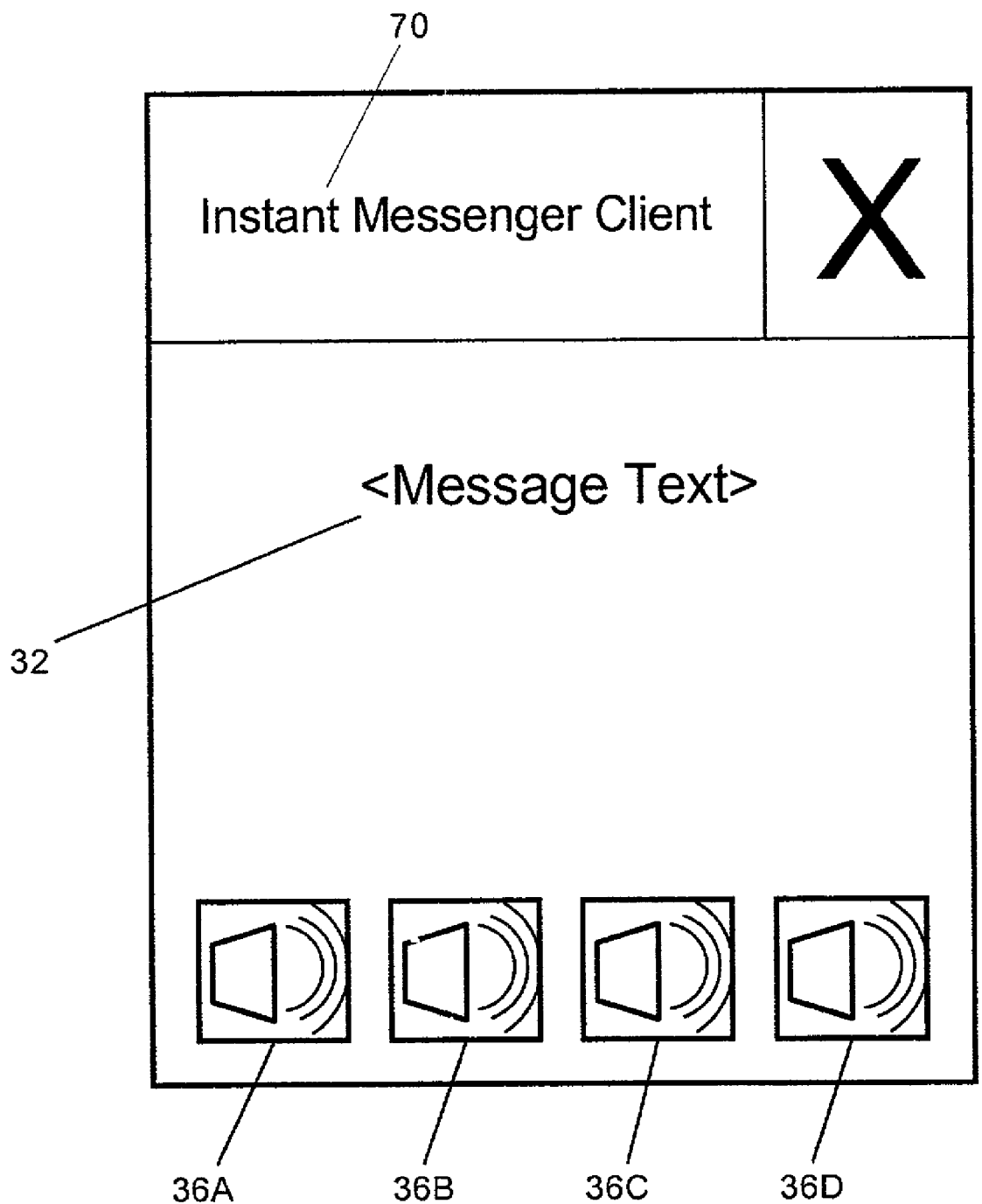
FIG. 3 is a block diagram of an exemplary IM/chat client in accordance with the inventive arrangements.

Though only a single selectable icon 36 is shown in FIG. 2, the invention is not so limited. Accordingly, FIG. 3 is a block diagram of an exemplary IM/chat client in accordance with the inventive arrangements having a plurality of selectable icons 36A, 36B, 36C, and 36D, as well as contents 32. Based upon recipient and recipient node information extracted from the message header component 50A, or the voice conference identifier as specified herein, corresponding selectable icons 36A–36D can be provided. Alternatively, the icons can be included within the IM. The selectable icons 36A–36D can include a reference to a corresponding conference call node such as an appropriate text label. Responsive to the selection of the selectable icons 36A–36D, a voice communications link can be established between one or more corresponding conference call nodes. For example, in the case where a user selects one of the plurality of selectable icons, a communications link can be established between the recipient node and the conference call node corresponding to the selected icon. Accordingly, upon selection of a second selectable icon, a voice communications link with the conference call node corresponding to that selected icon can be initiated such that a conference call results between the recipient node and the two selected conference call nodes. Where two or more icons are selected, a conference call can be established between conference call nodes corresponding to the selectable icons. Notably, the sending node and recipient node can be included in the conference call if so specified. In this manner conference calls can be established for all sending/recipient nodes, or for selected groups of sending/recipient nodes such as only those recipient nodes in a given department, or for other conference call nodes specified in the voice conference call list. In another embodiment, each icon of the plurality of selectable icons 36A–36D can correspond to a conference call connection with an identified group or class of conference call nodes, for instance departments or product design teams.

The present invention can be realized in hardware, software, or a combination of hardware and software. Moreover, the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Significantly, this invention can be embodied in other specific forms without departing from the spirit or essential attributes thereof, and accordingly, reference should be had to the following claims, rather than to the foregoing specification, as indicating the scope of the invention.

What is claimed is:

1. An instant messaging or chat (IM/chat) communication method comprising the steps of:
    inserting in a program code of an instant message (IM):
        a) a header component that provides identity information of an IM sender in a voice conference identifier for connecting a voice communication link from a recipient client to the IM sender
        b) a body component that provides message text that is displayed prior the connecting a voice communication link;
        c) an attachment component for including the voice conference identifier comprising a voice conference call list identifying conference call nodes;
    embedding compiled object code of said voice conference identifier in said attachment, wherein execution of said computer program code at a recipient node establishes a voice communications link between an IM sender and a recipient at the recipient node;
    transmitting said IM from the IM sender to the recipient at a recipient node;
    a recipient client presenting the identity information and the message text, and detecting the voice conference identifier within the IM;
    responsive to the detecting step, an IM interface of the recipient displaying a user-selectable text or graphic symbol; and
    responsive to a user-selection of said displayed text or graphic symbol, automatically establishing a voice communication link between the recipient and the IM sender using the compiled object code embedded in said IM by:
    executing said compiled object code on a machine hosting said IM interface,
    wherein execution of said compiled object code at the recipient node establishes the voice communications link between the IM sender and the recipient at the recipient node based on the identity information presented in the header component.

2. The IM/chat communication method of claim 1, wherein said voice communication link is a Voice over IP (VoIP) based voice communication links.

3. The IM/chat communication method of claim 1, wherein said voice communication link is a telephony-based voice communication link occurring over a public switched telephone network (PSTN).

4. The IM/chat communication method of claim 1, wherein said voice conference call list specifies telephone numbers for said identified conference call nodes.

5. The IM/chat communication method of claim 1, wherein said voice conference call list specifies IP addresses for said identified conference call nodes.

6. The IM/chat communication method of claim 1, said inserting step further comprising:
    inserting in said IM/chat message a selectable symbol for initiating said voice communication link with said selected ones of said identified conference call nodes.

7. The IM/chat communication method of claim 1, said inserting step further comprising:
    inserting in said IM/chat message a plurality of selectable symbols, each said symbol for initiating a voice communications link with a selected one of said identified conference call nodes.

8. An instant messaging or chat (IM/chat) communication method comprising the steps of:
    detecting within an IM message conveyed from a sender to a recipient at a recipient node a voice conference identifier comprising a voice conference call list identifying conference call nodes, wherein the IM message is a program code comprising
        a) a header component that provides identity information of an IM sender in the voice conference identifier for connecting a voice communication link from a recipient client to the IM sender
        b) a body component that provides message text that is displayed prior the connecting a voice communication link;
        c) an attachment component for including the voice conference identifier comprising a voice conference call list identifying conference call nodes;

responsive to detecting said voice conference identifier, displaying at least one selectable icon within an IM interface of said recipient corresponding to the voice conference identifier; and responsive to a selection of said at least one selectable icon by said recipient, extracting a compiled object embedded within said IM and executing said compiled object at the recipient node, said software program establishing a voice conference call between said recipient and said sender, wherein a voice communication program for executing the compiled object is automatically downloaded if the recipient node cannot execute the compiled object.

9. The IM/chat communication method of claim 8, wherein said displaying step displays a single icon and said establishing step establishes said voice conference call between said selected ones of said identified conference call nodes responsive to said selection of said single icon.

10. The IM/chat communication method of claim 8, wherein said displaying step displays a plurality of icons, each said icon corresponding to one of said voice conference call nodes, and wherein said establishing step establishes a voice communications link with said selected ones of said conference call nodes responsive to said selection of corresponding ones of said plurality of icons.

11. The IM/chat communication method of claim 8, wherein said software program is embedded within said IM, said establishing step further comprising:

extracting from said IM embedded software program.

12. The IM/chat communication method of claim 8, wherein said voice conference call list includes telephone numbers for said identified conference call nodes.

13. The IM/chat communication method of claim 8, wherein said voice conference call list includes IP addresses for said identified conference call nodes.

14. The IM/chat communication method of claim 8, wherein said voice conference call is established using Voice over IP (VoIP) based voice communications links.

15. The IM/chat communication method of claim 8, wherein said voice conference call is established using telephony-based voice communications links over a public switched telephone network (PSTN).

16. The IM/chat communication method of claim 8, said establishing step further comprising:

responsive to said selection of said at least one icon, determining a telephone number or an IP address for said selected ones of said identified conference call nodes based on said voice conference call list.

17. An instant message included within a computer readable medium comprising:

header information, said header information identifying a sending node and a recipient node;

a message portion, said message portion displaying content from said sending node to said recipient node; and an attachment portion, said attachment portion including a voice conference identifier comprising a voice conference call list specifying conference call nodes to be connected via a voice conference call, and an embedded software program, comprising compiled object code;

wherein said recipient node is a conference call node, wherein said voice conference identifier is configured to be detected by an IM chat client and cause said IM chat client to responsively display a selectable item which when selected causes said embedded compiled object code to be executed at said recipient node to establish a voice communication link among said conference call nodes.

18. A computer program included within a computer readable medium, said computer program having a plurality of code sections executable by a machine for causing the machine to perform the steps of:

inserting in a program code of an instant message (IM):
   a) a header component that provides identity information of an IM sender in a voice conference identifier for connecting a voice communication link from a recipient client to the IM sender
   b) a body component that provides message text that is displayed prior the connecting a voice communication link;
   c) an attachment component for including the voice conference identifier comprising a voice conference call list identifying conference call nodes;

inserting in said IM a plurality of selectable symbols, each said symbol for initiating a voice communications link with said selected ones of said identified conference call nodes;

embedding compiled object code of said voice conference identifier in said attachment;

wherein said computer program code is executed at a recipient node in response to a user selecting one of said plurality of selectable symbols, wherein execution of said computer program code establishes said voice communications link;

transmitting said IM from the IM sender to the recipient at a recipient node;

a recipient client presenting the identity information and the message text, and detecting the voice conference identifier within the IM;

responsive to the detecting step, an IM interface of the recipient displaying a user-selectable text or graphic symbol; and responsive to a user-selection of one of said plurality of selectable symbols, displayed text or graphic symbol, automatically establishing a voice communication link between the recipient and the IM sender using the compiled object code embedded in said IM by:

executing said compiled object code on a machine hosting said IM interface, wherein execution of said compiled object code at the recipient node establishes the voice communications link between the IM sender and the recipient at the recipient node based on the identity information presented in the header component.

19. The computer program of claim 18, wherein said voice communication link is a Voice over IP (VoIP) based voice communication links.

20. The computer program of claim 18, wherein said voice communication link is a telephony-based voice communication link occurring over a public switched telephone network (PSTN).

21. The computer program of claim 18, wherein said voice conference call list specifies telephone numbers for said identified conference call nodes.

22. The computer program of claim 18, wherein said voice conference call list specifies IP addresses for said identified conference call nodes.

23. The computer program of claim 18, said inserting step further comprising:

inserting in said IM/chat message a selectable symbol for initiating said voice communication link with said selected ones of said identified conference call nodes.

24. A computer program included within a computer readable medium, said computer program having a plurality of code sections executable by a machine for causing the machine to perform the steps of:
- detecting within an IM message conveyed from a sender to a recipient at a recipient node a voice conference identifier comprising a voice conference call list identifying conference call nodes, wherein the IM message is a program code comprising
  - a) a header component that provides identity information of an IM sender in the voice conference identifier for connecting a voice communication link from a recipient client to the IM sender
  - b) a body component that provides message text that is displayed prior the connecting a voice communication link;
  - c) an attachment component for including the voice conference identifier comprising a voice conference call list identifying conference call nodes;
- responsive to detecting said voice conference identifier, displaying at least one selectable icon within an IM interface of a recipient corresponding to the voice conference identifier; and
- responsive to a selection of said at least one selectable icon
- by said recipient, extracting a compiled object embedded within said IM and executing said compiled object at the recipient node, said software program establishing a voice conference call between said recipient and said sender, wherein a voice communication program for executing the compiled object is automatically downloaded if the recipient node cannot execute the compiled object.

25. The computer program of claim 24, wherein said displaying step displays a single icon and said establishing step establishes said voice conference call between said selected ones of said identified conference call nodes responsive to said selection of said single icon.

26. The computer program of claim 24, wherein said displaying step displays a plurality of icons, each said icon corresponding to one of said voice conference call nodes, and wherein said establishing step establishes a voice communications link with said selected ones of said conference call nodes responsive to said selection of corresponding ones of said plurality of icons.

27. The computer program of claim 24, wherein said voice conference call list includes telephone numbers for said identified conference call nodes.

28. The computer program of claim 24, wherein said voice conference call list includes IP addresses for said identified conference call nodes.

29. The computer program of claim 24, wherein said voice conference call is established using Voice over IP (VoIP) based voice communications links.

30. The computer program of claim 24, wherein said voice conference call is established using telephony-based voice communications links over a public switched telephone network (PSTN).

31. The computer program of claim 24, said establishing step further comprising:
- responsive to said recipient selecting said at least one icon, determining a telephone number or an IP address for said selected ones of said identified conference call nodes based on said voice conference call list.

32. An instant messaging or chat session client stored upon a computer readable medium comprising:
- a conventional IM processor, said conventional IM processor extracting and displaying message text encapsulated in a received IM; and,
- a voice conference processor, said voice conference processor identifying a voice conference identifier encapsulated in said received IM, displaying at least one selectable icon in response to detecting said voice conference identifier, and responsive to a selection of said at least one selectable icon, executing compiled object code extracted from said received IM to establish a voice conference call between selected conference call nodes specified by said voice conference identifier, wherein said voice conference call occurs over a telephony-based voice communication link.

* * * * *